United States Patent [19]
Grabb et al.

[11] 3,754,841
[45] Aug. 28, 1973

[54] VACUUM INTENSIFIED BRAKE BOOSTER SYSTEM

[75] Inventors: Frederick G. Grabb; Mark E. Beck, both of South Bend, Ind.

[73] Assignee: The Bendix Corporation, South Bend, Ind.

[22] Filed: May 14, 1971

[21] Appl. No.: 143,419

[52] U.S. Cl. .............................................. 417/189
[51] Int. Cl. .............................................. F04f 5/48
[58] Field of Search ..... 417/187, 188, 189, 190, 191; 60/54.5 P, 54.6 P

[56] References Cited
UNITED STATES PATENTS
2,337,283  12/1943  Tinker ........................... 417/188 X
2,340,671  2/1944  Lingenbrink .................... 417/189 X Primary Examiner—William L. Freeh
Assistant Examiner—George LaPointe
Attorney—Leo H. McCormick, Jr. and Plante, Hartz, Smith and Thompson

[57] ABSTRACT

An apparatus for sensing the available vacuum in a power braking system having the ability to generate an additional source of vacuum which can be combined with the vacuum in the system to maintain the vacuum in the system within a predetermined range.

10 Claims, 5 Drawing Figures

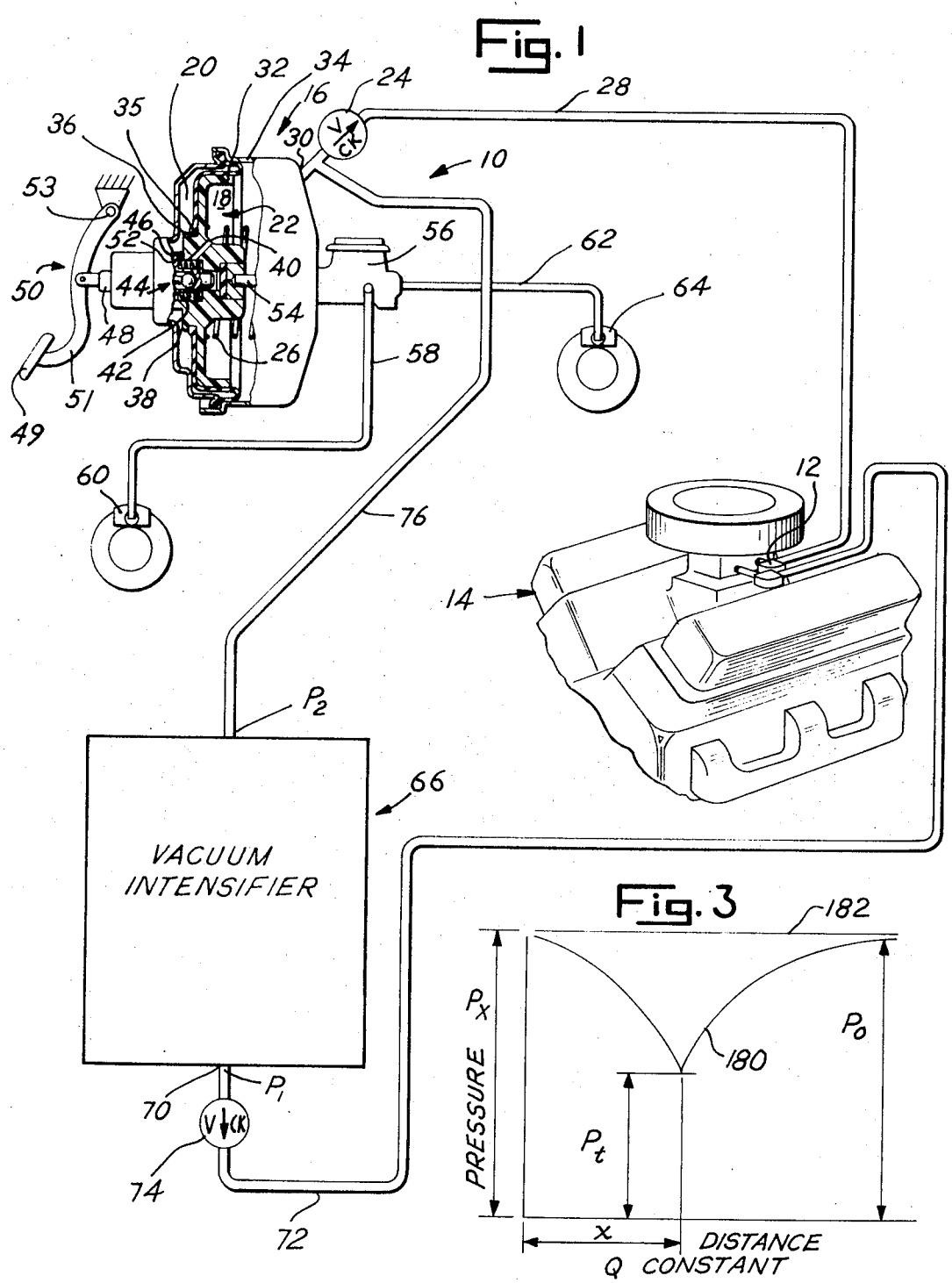

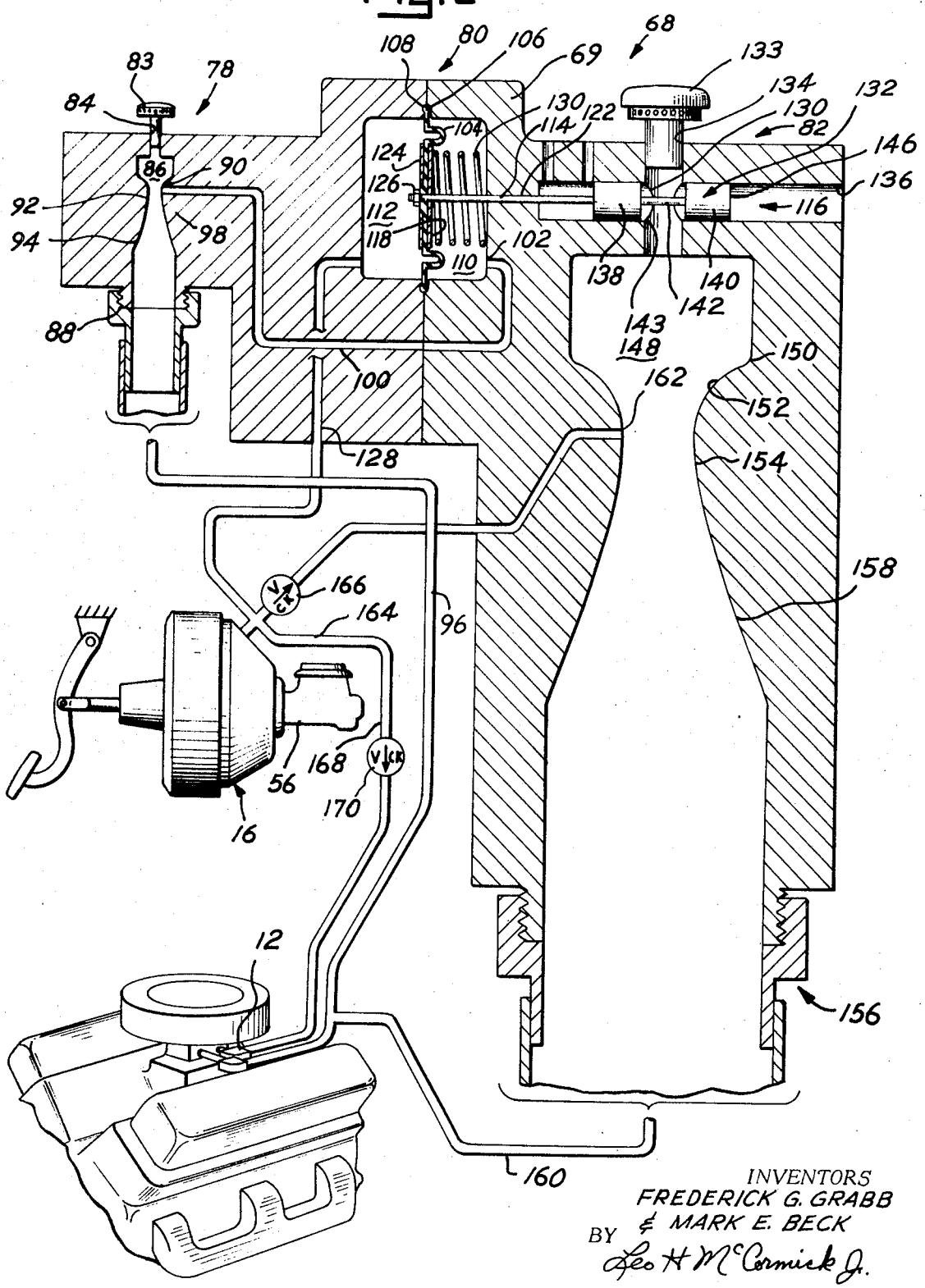

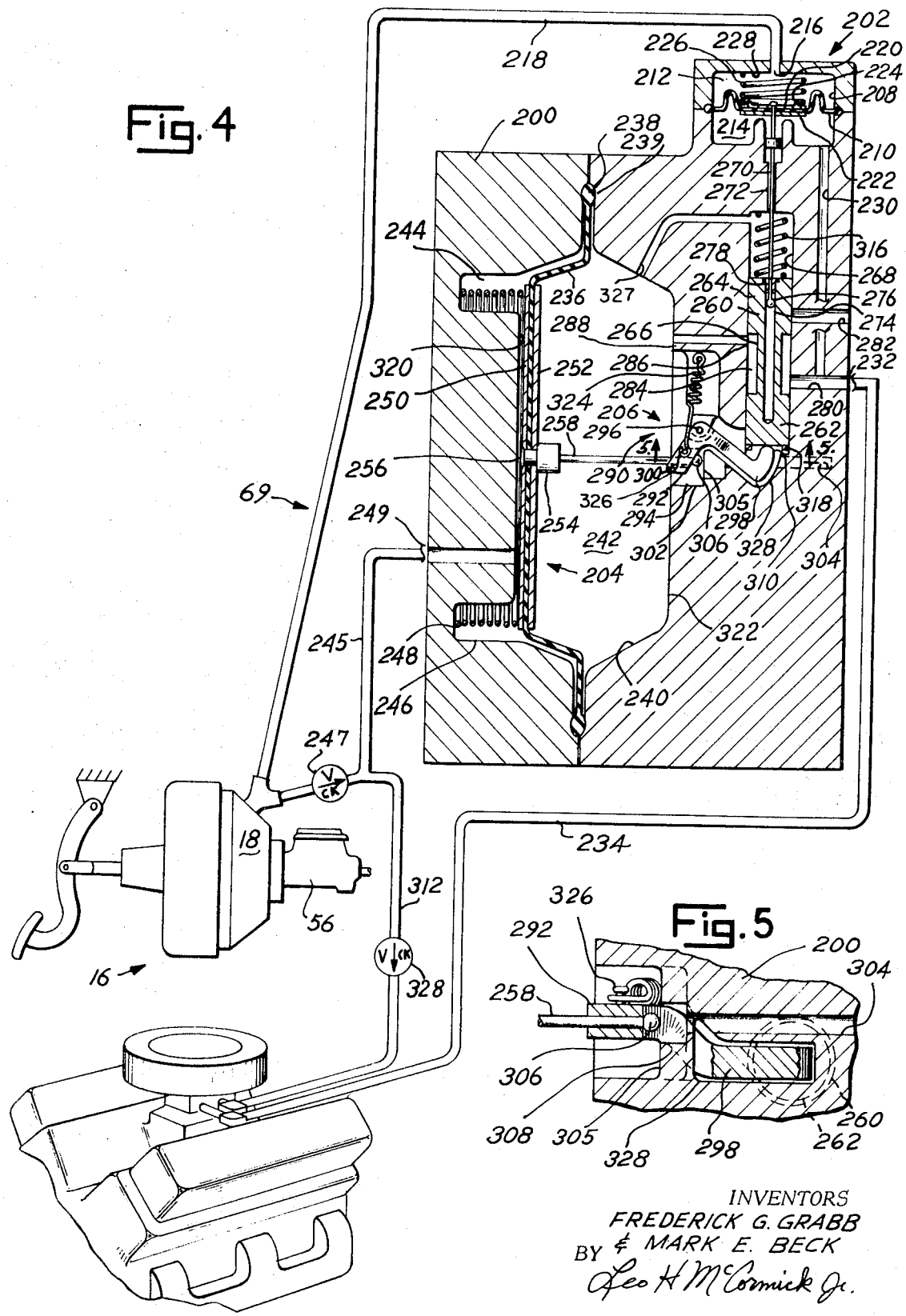

VACUUM INTENSIFIED BRAKE BOOSTER SYSTEM

BACKGROUND OF THE INVENTION

Atmospheric pressure is the actuating force used to create a pressure differential across a normally vacuum suspended diaphragm to operate a vacuum power brake system of a vehicle powered by an internal combustion engine. A vacuum is created at the intake manifold due to the pumping action of the pistons in the engine as they draw air into the cylinders. The resulting vacuum occurs because the throttle valve partly obstructs the flow of incoming air through the carburetor so that air cannot enter the manifold fast enough to keep up with the rapidly descending pistons. Consequently, a certain amount of air must fill a space much larger than it would occupy under atmospheric conditions, producing reduced air pressure or a partial vacuum which is used to suspend the diaphragm of the servomotor. The output force produced by the vacuum power brake is directly dependent upon the difference in the atmospheric pressure and the partial vacuum produced. However, in some presently designed engines equipped with emission control systems, the exhaust gases are recirculated through and dumped in the manifold. This amount of dumped exhaust gas will reduce the pressure differential between the atmosphere and the partial vacuum produced. Thus, in operating such a power brake system, the servomotor is incapable of producing the necessary operating force to pressurize a master cylinder supplying fluid to each wheel cylinder to bring a vehicle to a stop within a required distance.

SUMMARY OF THE INVENTION

To maintain an effective operating pressure differential between atmospheric pressure and the vacuum supplied from the manifold, we have invented an apparatus with intensifying means to raise the available vacuum upon demand in a power braking system.

Our vacuum intensifier means has a reference chamber connected to the intake manifold to cause a first fluid to flow past a restriction having an orifice to produce a reference pressure signal. This reference pressure signal is communicated to a control chamber. The control chamber is divided into a front chamber and rear chamber by wall means. The reference signal is communicated to the front chamber and the rear chamber which is connected to a servomotor partial vacuum supply. When a pressure differential across the wall means is created between the reference signal and the partial vacuum being supplied the servomotor, the wall means will move. Movement of the wall means causes valve means in a power chamber to operate and control the flow of a second fluid through a variable area orifice. The flow of the second fluid through a restriction will cause the fluid pressure to be lowered and create a partial vacuum. An orifice in this restriction is in communication with the partial vacuum supply conduit to the servomotor. The partial vacuum created by the second fluid will aid the available partial vacuum to lower the effective pressure level of the partial vacuum supplied to operate the servomotor in the power braking system.

In a secondary embodiment a single phase vacuum pump has a sensor which continually compares the vacuum in the servomotor with the vacuum being produced at the manifold by the vehicle. If the vacuum in the servomotor is below a predetermined value, a movable wall is vacuum powered to lower the pressure to a level which will enable the output force produced by the servomotor to remain within a relative predetermined range.

It is an object of this invention to provide a power braking system with means to intensify the vacuum produced by an internal combustion engine.

It is another object of this invention to provide means for maintaining the vacuum operating level of a vacuum power braking system within a predetermined range.

It is still another object of this invention to provide means for continually sensing the available vacuum produced by an internal combustion engine for operating a power braking system.

It is still a further object of this invention to maintain the vacuum supplied to a servomotor within a predetermined range.

It is still a further object to provide a vacuum powered braking system with vacuum intensifying means which does not effect the operating efficiency of an internal combustion engine.

These and other objects will become apparent to those who read this specification and view the drawing.

BRIEF DESCRIPTION OF THE DRAWINGS

FIG. 1 is a schematic illustration of a power braking system having vacuum intensifying means located therein to maintain the operational pressure differential in the servomotor within a predetermined range;

FIG. 2 is a schematic illustration of an enlarged sectional view of a vacuum intensifier means operatively connected to the servomotor of the power braking system of FIG. 1;

FIG. 3 is a graph of a fluid flowing through a converging-diverging restriction of the vacuum intensifier in FIG. 2 showing the pressure change as the fluid flows therethrough;

FIG. 4 is a schematic illustration of an enlarged sectional view of another embodiment of a vacuum intensifier means for use in the power braking system of FIG. 1; and FIG. 5 is a sectional view taken substantially along line 5—5 of FIG. 4 showing the relative position of the switching means to the control means.

DETAILED DESCRIPTION OF THE PREFERRED EMBODIMENT

Throughout this specification it will be recognized that the following terminology will be used to identify the various parameters in the various equations:

$P_a$ = atmospheric pressure $P_{a_1}$ = first source of fluid pressure (atmospheric) communicated to a reference chamber $P_{a_2}$ = second source of fluid pressure (atmospheric) connected to a power chamber $P_E$ = engine intake manifold pressure (a partial vacuum pressure)

$P_s$ = fluid pressure communicated to the servomotor from the intake manifold $P_r$ = operational fluid pressure of the servomotor $P_r$ = fluid pressure in a constant volume chamber $P_o$ = reference pressure signal $P_p$ = fluid pressure created in a power chamber $Q_1$ = quantity of a first fluid flowing through a reference chamber at a given time
$Q_2$ = quantity of a second fluid flowing through a power chamber
$Q_N$ = fluid flowing through a nozzle
$V_1$ = velocity at which $Q_1$ flows through reference chamber
$V_2$ = velocity of $Q_2$ in a dampening chamber
$A_1$ = fixed area inlet
$A_2$ = area of a constant volume chamber
$A_x$ = area at a distance $x$ from inlet to a venturi
$P_x$ = pressure at point $x$
$P_{t_1}$ = minimum pressure in reference venturi
$P_{t_2}$ = minimum pressure in power venturi
$P_D$ = pressure of a second fluid in dampening chamber
K = constant recognized by those skilled in the art to include the specific weight ($W_1$) effects of gravity ($g$) and nozzle flow coefficients for a particular fluid
$V_a$ = velocity of fluid in $A_2$ In the power braking system 10 shown in FIG. 1, air from the intake manifold 12 of an internal combustion engine 14 is supplied to the servomotor means 16 at a pressure less than atmospheric to create a partial vacuum $P_s$ in the front chamber 18 and the rear chamber 20 to suspend a movable wall means 22. A check valve 24 will permit the air at atmospheric pressure $P_a$ or lower to be evacuated from within the servomotor but once the optimum partial vacuum pressure level $P_E$ capable of being produced by the engine 14 is reached, no further flow will occur. The check valve 24 will only permit flow from the servomotor 16, so that under normal conditions the movable wall means 22 will be positioned in the rest location as shown in FIG. 1 by resilient member 26. The available partial vacuum $P_E$ at the intake manifold 12 will be communicated from conduit 28 through an inlet 30 into the front chamber 18.

The movable wall means 22 has a diaphragm 32 with an outer diameter secured to the periphery of the housing 34 of the servomotor and an inner diameter opening 35 which snap into a groove 36 of a hub 38. The hub 38 has a passage 40 from the front chamber 18 to a control chamber 42. The control chamber has a valve means 44 held in the hub 38 to control the flow of fluid from the control chamber 42 through passage 46 into the rear chamber 20. A push rod 48 attached to the valve means 44 is connected to a pedal actuator means 50.

Upon movement of the pedal actuator means 50, the valve means 44 will move in the hub until seal 52 has closed off the passage 46 from the partial vacuum $P_s$ communication and opened passage 46 to atmospheric pressure $P_a$. With atmospheric pressure $P_a$ in rear chamber 20 and a partial vacuum $P_s$ in the front chamber 18, a pressure differential will be created across the wall means 22. This pressure differential will transmit an output force through push rod 54 to pressurize fluid in a master cylinder 56. This pressurized fluid is transmitted through supply conduits 58 to the front wheel brakes 60 (only one being shown) of a vehicle and conduit 62 to the rear wheel brakes 64 (only one being shown).

The force through which the master cylinder 56 is pressurized is directly dependent upon the difference in pressure between atmospheric pressure $P_a$ and the partial vacuum $P_E$ produced by the manifold 12 in the vehicle and the force exerted by the pedal actuator means attached to the valve rod 48. To meet certain safety standards set by the Department of Transportation, this pressure differential cannot be less than a certain amount for a given installation. However, at times the available partial vacuum $P_E$ produced in the manifold 12 by the engine 14 in some high performance engines, and other engines equipped with emission controls, will not meet this pressure level. To maintain the pressure differential within the servomotor 16, a vacuum intensification means 66 is connected between the check valve 24 in the supply conduit 28 and the inlet 30 to the front chamber 18.

The intensification means 66 could be any means capable of sensing a need for increased operating pressure requirements, such as: the venturi vacuum intensifier means 68 shown in FIG. 2, the vacuum pump means 69 shown in FIG. 4 or a storage reservoir with refurbishing means (not shown), so long as the pressure drop across the vacuum intensifier 66 is sufficient when combined with the partial vacuum $P_E$ available in conduit 28 to meet and maintain the required standard pressure $P_v$ level in the servomotor 16. To reduce the amount of work needed to be performed by the vacuum intensifier 66, an outlet 70 is also connected to the intake manifold 12 by conduit 72. A check valve 74 located between the outlet 70 and the intake manifold 12 will sustain any pressure drop created in the vacuum intensifier 66 within the supply conduit 76. Thus, by providing the power braking system with a vacuum intensifier, it is possible to effectively and consistently operate the servomotor at all times with an output pressure force within a predetermined range with certainty.

MODE OF OPERATION OF THE PREFERRED EMBODIMENT

With the engine 14 operating, partial vacuum $P_E$ will evacuate the air from servomotor 16 through conduit 28. Both the front chamber 18 and the rear chamber will be evacuated with the wall means 22 held in the rest position by resilient means 26 as shown in FIG. 1. The vacuum intensifier will sense the pressure level $P_s$ of the partial vacuum in the front chamber 18 of the servomotor 16. If $P_s$ is below a predetermined value, the vacuum intensifier is activated and lowers the pressure in conduit 76 a predetermined amount to $P_v$. By having a check valve 74 located in the return conduit 72 any intensification of the partial vacuum level $P_s$ to the partial vacuum pressure $P_v$ will be sustained within the supply system conduit 76.

Upon depressing the brake pedal 49, lever arm 51 will pivot on pin 53 and an input force from an operator will be transmitted to the valve means 44. Valve means 44 will move until seal 52 is past outlet 46 to thereby close communication between the front chamber containing the partial vacuum $P_v$. With seal 52 located between passage 40 and passage 46, atmospheric pressure $P_a$ is freely communicated to the rear chamber to create a pressure differential across the wall means 22. When wall means 22 moves, the fluid in the master cylinder 56 will be pressurized to activate the wheel cylinders 60 and 64 to bring the vehicle to a stop. Thus, by providing the system with a partial vacuum intensifier means 66, the output force from the servomotor to the master cylinder can accurately be predicted to consistently fall within a predetermined range.

The venturi vacuum intensifier means 68 shown in FIG. 2 consists of a housing 69 having reference chamber means 78, a control chamber means 80 and a power chamber means 82.

The reference chamber means 78 consists of a fixed area inlet 84 in communication with a first fluid under pressure (atmospheric pressure $P_{a_1}$) which flows into a constant volume chamber 86. A nozzle outlet means 88 having a converging section 90 adjacent the constant volume chamber 86 transitioning into a parallel throat 92 and a diverging section 94 whose area approaches the inlet of the converging section 90 which is connected to a conduit 96. The conduit 96 is in communication with the intake manifold 12 where a partial vacuum $P_E$ is produced. An orifice 98 located in the throat section 92 will carry a reference pressure signal $P_O$ through passage 100 to an inlet 102 in the control chamber means 80. A filter 83 surrounds the fixed inlet 84 to prevent any contaminents in the first fluid from entering into the constant volume chamber 86 and thereby disrupting the flow.

The control chamber means 80 consists of a diaphragm member 104 secured around its periphery by heas 106 being held in a groove 108 in the housing 69. The diaphragm member 104 divides the control chamber means 80 into a front chamber 110 and a rear chamber 112. The diaphragm member 104 is placed between a first backing plate 118 and a second backing plate 124. A nut 126 is secured to a push rod 114 to keep the diaphragm member 104 sandwiched between the backing plates 118 and 124. The push rod 114 is carried through a bearing surface 122 in the housing 69 to operate valve means 116 in the power chamber means 82. The front chamber 110 receives the reference pressure signal $P_O$ through inlet 102 and the rear chamber 112 receives the partial vacuum pressure $P_s$ communicated to the servomotor means 16 through conduit 128. A resilient member 130 located in the front chamber 110 will place a predetermined force on the push rod 114 through which any pressure differential across diaphragm member 104 must overcome in order to change the position of the valve means 116 in a variable area opening 130 in the power chamber means 82. The position of the plunger means 132 of the valve means 116 contained in the power chamber means 82 is directly dependent upon the pressure differential across the diaphragm member 104.

The power chamber means 82 consists of an inlet 134 connected to a second source of fluid under pressure $P_{a_2}$, which in our case is at the same pressure as the first source of fluid $P_{a_1}$ since atmospheric pressure $P_a$ is being used in both the reference chamber and the power chamber. A bore 136 in the housing 69 is perpendicular to the inlet 134 and opened to the atmospheric pressure $P_a$ on both ends. The plunger means 132 which is attached to the push rod 114 is retained in the bore 136. The plunger means 132 has a first cylindrical face 138 and a second cylindrical face 140 separated by a smaller diameter stem 142. The cylindrical face 138 is long enough so that when partial vacuum in chamber 112 reaches a predetermined maximum above the reference signal $P_o$, the resilient member 130 will be collapsed and the inlet 134 closed.

Conversely, when the reference signal $P_O$ in chamber 110 indicates that the engine 14 is not generating a sufficient partial vacuum $P_E$ then resilient member 130 will move cylindrical face 140 in bore 136 to close the inlet 134. Since atmospheric pressure $P_a$ is free to act on both ends 144 and 146, the only force acting on the plunger means 132 is that created in the control chamber means 80. In any intermediate positions, the cylindrical faces 138 and 140 will allow varying amounts of the second fluid $P_{a_2}$ through inlet 134 past bore 136 and into a dampening chamber 148. A filter 133 surrounds the inlet 134 to prevent any contaminents in the second fluid $P_{a_2}$ from entering and disrupting the fluid flow to the dampening chamber 148. The dampening chamber is large enough to disperse any turbulence in the flow of the second fluid $Q_2$ through the varying area inlet 143. The dampening chamber 148 has an outlet 150 whose inner surface 152 converges toward a restricted throat section 154. The throat section 154 is connected to a diffuser means 156 by a diverging section 158 whose cross sectional area approaches the cross sectional area of the outlet 150 from the dampening chamber 148. The diffuser means 156 is connected to the intake manifold 12 by a conduit 160. Located in the throat section 154 is an orifice 162 which is connected to the supply conduit 164 through a check valve 166. The servomotor means 16 is connected to the intake manifold 12 through conduit 168 with an additional check valve 170. Thus, the partial vacuum $P_s$ available in the servomotor from the intake manifold 12 and the created partial vacuum $P_p$ in the power chamber means 68 will be sustained in the servomotor by the check valves 166 and 170 since passage 128 is a non-flow line whose purpose is merely to sense available pressure $P_s$ in the servomotor 16.

The intensifying means 68 will operate in the following manner: The reference chamber means 78 is connected to the intake manifold 12 of the engine 14 by conduit 96. With vacuum $P_E$ being produced, the first source of fluid $P_{a_1}$ is drawn through the fixed area inlet 84 into a constant volume chamber 86. When $P_a$ is greater than $P_E$ a certain amount of the first fluid $Q_1$ will flow through the fixed area $A_1$ inlet 84 with a velocity $V_1$ which will be calculated from the following equation:

$$V_1 = K \sqrt{2(P_a - P_E)}$$

With $V_1$ known, the amount of fluid $Q_1$ can now be calculated by the following equation:

$$Q_1 = V_1 A_1$$

Thus, the amount of $Q_1$ flowing through the reference chamber means 86 is fixed under a given pressure condition and renders the flow constant through chamber 86. It is easy to calculate the velocity of the fluid therein by this continuity equation:

$Q_1 = V_2 A_2$ When $A_2$ is larger than $A_1$, there will be a corresponding decrease in fluid pressure from $P_{a_1}$ to $P_r$. The relationship between the fixed area inlet $A_1$ and the constant volume $A_2$ chamber 86 is chosen such that the resulting pressure $P_r$ in the constant volume chamber 86 therein is about 20 percent greater than $P_E$. The flow through the nozzle outlet 88 can be calculated as follows using the following formula which is applicable to a venturi flow member:

$$Q_N = K A_x \sqrt{2(P_E - P_x)}$$

Thus for any point $x$ along the converging 92 and diverging 94 portions of nozzle 88, the pressure $P_x$ can be determined and will be between lines 180 and 182 shown in FIG. 3 with the minimum pressure $P_t$ and greatest velocity being present in the throat section 92 a distance $x$ from the entrance to the converging section. This minimum pressure $P_t$ is the reference pressure signal $P_o$ communicated through orifice 98 by way of conduit 100 to the front chamber 110 of the control reference means 80.

When $P_o$ in the front chamber 110 and the force of resilient member 130 acting against the force created by $P_s$ of the partial vacuum communicated through conduit 128 to the rear chamber 112 are balanced the valve means 116 remains stationary. However, any pressure differential change in either $P_o$ or $P_s$ will create an unbalance causing the valve means 116 to move and change the amount of the second fluid flowing through the restriction 143. Thus, the amount of the second fluid $Q_2$ flowing through variable area inlet 143 can be changed at any time. However, for any $Q_2$ which is permitted to flow through inlet 143, the velocity of the fluid is reduced in the dampening chamber 148. The ideal velocity $V_2$ of the second fluid in dampening chamber 148 would be created if the pressure $P_D$ in the dampening chamber which is about 20 percent greater than $P_E$ generated at the intake manifold 12. With the pressure $P_D$ of the second fluid at outlet 150 being about 20 percent greater than $P_E$, the pressure through the power venturi means 82 will be approximated to be between lines 182 and 180 of FIG. 3, also. The lower pressure created in the throat section 154 will be $P_{t_2}$ and transmitted to check valve 166 through orifice 162. $P_{t_2}$ is continually compared with $P_s$. If $P_{t_2}$ is lower than $P_s$, the check valve 166 will permit the air to be evacuated from the servomotor 16 to a predetermined operational fluid pressure equal to $P_{t_2}$. If $P_{t_2}$ is of a higher pressure than $P_s$, as when the engine is producing sufficient operating partial vacuum $P_E$, the check valve 166 will not permit a back flow to occur. Thus, the flow $P_{t_2}$ can only occur when a demand need is sensed by the control chamber means 80. The maximum partial vacuum $P_{t_2}$ generatable by the power chamber means will be when variable area inlet 143 is opened as shown in FIG. 2 and will be progressively less as the plunger means 132 of the valve means 116 is moved to close off the variable opening 130.

Initially, when the engine 14 of the vehicle is stopped, spring 130 holds the face 140 of valve means 116 in a position to fully close the inlet 143. Where the vehicle is started, a partial vacuum $P_E$ is produced and the reference signal $P_o$ generated in throat 92 is carried through orifice 98 through 100 to create a pressure differential across the diaphragm member 104. This pressure differential will fully open valve means 116 to provide the maximum flow of the second fluid, $P_{a_2}$, through the power chamber means 68. As the air under atmospheric pressure $P_a$ in the servomotor is evacuated, the reference signal $P_o$, is reduced. The differential across diaphragm 104 between $P_o$ and $P_s$ move the face 138 of valve means 116 to close the variable area inlet 134 to stop the flow of the second fluid $P_{a_2}$ through the power venturi. Then, only on demand, as sensed by the control chamber means 80 will the power chamber means 68 be operatable.

The single phase vacuum pump means 69 shown in FIG. 4 consists of a housing 200 having a sensor means 202 and a movable wall means 204 with a control means 206. The control means 206 is responsive to the sensor means 202 for alternatively porting an operational fluid force to the wall means 204 to reduce the partial vacuum level from $P_s$ to $P_v$ in the servomotor 16 and maintain the output force of the master cylinder 56 within a predetermined range.

In more particular detail, the sensor means 202 includes a chamber 208 divided by a diaphragm member 210 into a pressure sensing chamber 212 and a control chamber 214. The pressure sensing chamber 212 has an opening 216 connected to the vacuum chamber of the servomotor 16 by a conduit 218. The diaphragm member 210 is sandwiched between backing plates 220 and 222. Backing plate 220 has a concentric rib 224 which centrally positions a spring member 226 against the wall 228 of the chamber 208. An internal passage 230 connects the control chamber 214 with an inlet port 232 in communication with the intake manifold 12 of the internal combustion engine 14 through conduit 234 where the partial vacuum pressure $P_E$ is produced.

The movable wall means 204 includes a flexible diaphragm member 236 with a head 238 retained in a groove 239 in the housing 200 which divides a cavity 240 into a front chamber 242 and a rear chamber 244. The rear chamber 244 is connected by conduit 245 to a check valve 247 adjacent the vacuum chamber 18 of the servomotor 16 to receive the partial vacuum $P_s$ supplied from the manifold 12 and the front chamber 242 is alternately connected to atmospheric pressure $P_a$ and partial vacuum $P_E$ through the control means 206. The housing 200 has a cylindrical groove 246 for holding and centrally positioning a resilient member 248 against a rear backing plate 250 of the diaphragm member 236. A front backing plate 252 concentrically located with the rear backing plate 250 has a central cylindrical projection 254 into which a rivet 256 is placed to hold diaphragm member 236 tight between the front and rear backing plates 250 and 252, respectively. A shaft 258 is centrally located on the front of cylindrical projection 254 and extends into the control means 206.

The control means 206 includes a plunger member 260 with a first large diameter portion 262 and a second large diameter portion 264 separated by a small diameter portion 266 retained in a bore 268 in the housing 200. A connecting rod 270 is attached to the flexible diaphragm 210 of the sensor means 202 and extends through a bearing surface 272 in the housing into bore 268. The plunger member 260 has a blind cavity 274 into which a spherical end 276 on the connecting rod 270 is positioned and retained by cap 278 on the end of the plunger member 260. A porting chamber 284 in bore 268 is connected to the partial vacuum pressure $P_E$ by inlet port 232 by passage 280 and to the atmospheric pressure $P_a$ through passage 282. An outlet 286 from the porting chamber 284 is directly connected to the front chamber 242 by passage 288.

A switching lever arm means 290 has a first leg 292 perpendicularly located to a second leg 298 and pivotally located on pin 296. The first leg 292 extends into bore 294 adjacent the front chamber 242. The first leg 292 contains a slot 300 which is in axial alignment with the shaft 258 extending from the cylindrical projection 254 of movable wall means 204. Bore 294 has a first section 302 whose diameter corresponds to and receives the cylindrical projection 254 and a second bore 304 of a smaller diameter corresponding to the spherical end 306 of shaft 258.

The second leg 298 has a curved offset portion 308 which will position end 310 of the switching lever arm means 290 in a perpendicular position with the first large diameter portion 262 in bore 268 of the control means 206.

The partial vacuum pressure $P_E$ produced at the intake manifold 12 of the internal combustion engine 14 will be simultaneously carried through conduit 312 to evacuate the air from the vacuum chamber in the servomotor 16 to a pressure level $P_s$, conduit 234 to inlet 232, and through internal passage 230 to the control chamber 214 of the sensor means 202. Conduit 218 relays the partial vacuum pressure $P_s$ level existing in the servomotor to the sensing chamber 212. If the combined force of the pressure force relayed to the sensing chamber 212 and the spring member 226 are less than the pressure force of the partial vacuum pressure $P_E$ existing in control chamber 214, a pressure differential will exist across diaphragm member 210. This pressure differential will move the diaphragm member 210 and cause connecting rod 270 to slide in the blind cavity 274 of the plunger member 260. As the connecting rod 270 moves in the blind cavity, the resilient member 316 retained in the bore 268 will act on the second large diameter portion 264 and position the first large diameter portion 262 of the plunger member 260 against an annular stop 318. In this position the second large diameter portion 264 of the plunger member 260 will seal the atmospheric pressure $P_a$ communication passage 282 and open the partial vacuum pressure $P_E$ passage 280. Air under atmospheric pressure $P_a$ will now be present in the front chamber 242 and can now be evacuated by passing into the porting chamber 284 by passage 288 and out passage 280 to be dumped into the manifold 12 by connecting conduit 234. The rear chamber 246 is in constant communication with check valve 247 by conduit 245 and since partial vacuum pressure $P_E$ is available in the front chamber 242, spring 246 acting on backing plate 250 will move the diaphragm member 236 away from surface 320 toward face 322 of the cavity 240. As the movable wall means 204 moves toward face 322, additional air will be drawn from the servomotor through check valve 247 to occupy the space in the rear chamber 244. Correspondingly, spherical end 306 of shaft 258 will move away from leg 292 and into the second bore 304 as the wall means 204 moves (to the right as viewed in FIG. 4). As the front backing plate 252 approaches the front face 322, the cylindrical projection 254 initially contacts the first leg 292 of the switching lever arm means 290. With further movement of the diaphragm 236, the cylindrical projection 254 will cause the switching lever arm means 290 to pivot on pin 296 to transmit a force through the second leg 298. End 310 of the second leg 298 will push on the first large diameter 262 of the plunger member 260 with a force which overcomes resilient member 316 moving the large diameter end 262 past opening 280 to close the partial vacuum pressure $P_E$ source communicated through inlet 232. When the cylindrical projection 254 reaches the bottom 305 of the larger diameter bore 302, the second leg 298 will move the second large diameter end 264 past the passage 282 to permit atmospheric pressure $P_a$ to be communicated to porting chamber 284. The second leg 298 of the lever arm means 290 is held in this position by spring 324 passing the pivot point 296 and forming a triangle with the connection 326 on the opposite side of the pivot point 296. Atmospheric pressure $P_a$ will freely enter the porting chamber 284, pass through passage 288 into the front chamber 240 creating a pressure differential across the diaphragm 236. This pressure differential will overcome resilient member 248 and force the air evacuated from the servomotor 16 now present in the rear chamber 244 out opening 249 into conduit 245. Check valve 247 will prevent this pressurized air from entering the servomotor but check valve 328 will permit this pressurized air to flow through conduit 326 into the manifold 12. As movable wall means 204 moves toward the rear surface 320 of the cavity 240, spherical end 306 will engage leg 292 and pull the switching lever arm means 290 into the position shown in FIG. 4.

If the pressure differential across the diaphragm 210 of the sensor means is greater than the force of the spring member 316, the plunger will be held in a position where atmospheric pressure $P_a$ is communicated to the front chamber 242 and the movable wall means 204 will be held against the rear surface 320 causing resilient member 248 to be compressed as shown in FIG. 4.

Bore 268 is opened to cavity 240 on both ends through passage 326 and 328 to balance the pressure acting on the first and second large diameter sections 262 and 264, respectively. Thus, the position of the plunger member 260 is dependent only on the sensor means 202. However, if the sensor means 302 determines that the level of the pressure $P_s$ in the vacuum chamber of the servomotor is not within a predetermined range, the spherical end 276 again moves away from cap 278 and permits the resilient member 316 to move the plunger member 260 to the position shown in FIG. 4 and continue to repeat the cycle, whereby air is repeatedly evacuated from the servomotor 16 as described above. This cycle is repeated until the pressure differential in the sensor means 202 across the diaphragm 210 is sufficient to overcome the combined forces of resilient members 316 and 226. When this occurs, the output force of the servomotor will be capable of energizing the master cylinder 56 to bring a vehicle to a stop within the distance now suggested by presently applicable standards.

Thus, through our invention a means has been provided to combine the partial vacuum produced by an engine 14 and an additional lower partial vacuum to effectively operate the servomotor 16 with the same predictable output force repeatedly if a demand is sensed by a control means.

We claim:
1. A vacuum intensifier for use in a power braking system comprising:
   a housing having a reference chamber, a control chamber and a power chamber;
   first means located in said reference chamber for developing a reference pressure below the pressure source of a first fluid under pressure;
   second means located in said control chamber being connected to said first means and an operational conduit in communication with a first source of partial vacuum for distinguishing a pressure differential between said reference pressure and the partial vacuum available in said operational conduit; and
   valve means located in said power chamber responsive to said second means for controlling a variable area inlet in communication with a second source of fluid under pressure, said controlled variable area inlet permitting said second source of fluid to flow through a restricted section in said power chamber in response to the available partial vacuum in the operational conduit, said restricted section causing the pressure of the second source of fluid flowing therethrough to be lowered below the fluid pressure of said second source of fluid while at said variable area inlet, said restriction having an orifice connected to said operational conduit, said lowered fluid pressure of said second fluid combining with said source of partial vacuum to maintain the partial vacuum level in the operational conduit within a predetermined range.

2. The vacuum intensifier as recited in claim 1 wherein said second means includes:

wall means for dividing said control chamber into a front chamber and a rear chamber, said front chamber being connected to receive said reference pressure established by said first means, said rear chamber being connected to receive partial vacuum in said operational conduit, said wall means responding to a pressure differential between said front and rear chamber to transmit an operational signal to said valve means; and resilient means connected to said wall means and the housing of said control chamber for providing a predetermined load which the wall means must overcome before transmitting said operational signal to said valve means.

3. The vacuum intensifier as recited in claim 2 wherein said first means includes:

a fixed area inlet communicating with a constant volume chamber in said housing of said reference chamber, said fixed area inlet being connected to said first source of fluid under pressure; and nozzle means attached to an outlet communicating with said constant volume chamber and in communication with said first source of partial vacuum, said nozzle means having an orifice connected to said front chamber of said second means for communicating a pressure signal resulting from the flow of the first source of fluid past said orifice in response to the intensity of the available partial vacuum of said first source.

4. The vacuum intensifier as recited in claim 3 wherein said nozzle means includes:

a converging interior section adjacent the outlet of said constant volume chamber;

a throat section adjacent said converging section having an interior surface parallel to the axis of flow of the fluid, said orifice connected to said second means being located in said throat section; and a diverging section connected by a conduit to said first source of partial vacuum, said converging section permitting the fluid flow of said first fluid to achieve a maximum velocity through said throat section in a direct relationship to the discharge flow of said first fluid from the diverging section caused by said first source of partial vacuum, said maximum velocity of fluid through said throat lowering the static pressure of the first fluid below the static pressure of the fluid at the outlet of the constant volume chamber.

5. The vacuum intensifier as recited in claim 4 wherein said valve means include:

a plunger means slidable in a bore of said housing, said plunger means being connected to said wall means, said plunger means moving in response to said wall means to control the flow of the second source of fluid through said variable area inlet.

6. The vacuum intensifier as recited in claim 5, wherein said power chamber further includes:

a dampening chamber connected to said variable area inlet with an outlet whose inner surface converges into said restricted section;

said dampening chamber stabilizing the flow of the second source of fluid by providing a large area for storing a large quantity of the second fluid under a constant pressure below the pressure of the second fluid before entering said variable area inlet; and diffuser means having one end connected to said restricted section and the other end connected to said first source of partial vacuum, said diffuser having an interior surface sloping toward the other end whose opening approaches said outlet from the dampening chamber for reducing pressure losses between the variable area inlet and said source of partial vacuum.

7. The vacuum intensifier as recited in claim 6, wherein said first and second sources of fluid under pressure is equal to atmospheric pressure.

8. The vacuum intensifier as recited in claim 7 wherein said valve means further includes:

push rod means connected to said wall means and said plunger means for directly transmitting movement from said wall means to said plunger means.

9. The vacuum intensifier as recited in claim 8 wherein said plunger means further includes:

a piston member with first and second cylindrical portions of equal diameter separated by a stem of a smaller diameter whose length is equal to the diameter of the variable area inlet, said first and second cylindrical portions being equally acted on by air under atmospheric pressure communicated to said bore to reduce the possibility of an outside pressure differential affecting the position of the wall means in said control chamber.

10. The vacuum intensifier as recited in claim 9 further including:

filter means located adjacent said fixed inlet through which said first source of fluid flows and adjacent said variable area inlet through which said second source of fluid flows for preventing contaminants from entering and disrupting the fluid flow in the constant volume chamber and the dampening chamber.

* * * * *